March 9, 1937.  M. B. GEISELMAN  2,072,874
FURNACE
Filed Sept. 12, 1934  2 Sheets-Sheet 1

Inventor
Myron B. Geiselman
By Milans & Milans
Attorneys

March 9, 1937.  M. B. GEISELMAN  2,072,874
FURNACE
Filed Sept. 12, 1934    2 Sheets-Sheet 2

Inventor
Myron B. Geiselman
By Milans & Milans
Attorneys

Patented Mar. 9, 1937

2,072,874

UNITED STATES PATENT OFFICE 2,072,874

FURNACE

Myron B. Geiselman, Hanover, Pa.

Application September 12, 1934, Serial No. 743,742

2 Claims. (Cl. 110—45)

My invention relates to new and useful improvements in a furnace of the automatic stoker type and has for its principal object the provision of novel means for conveying the fuel, such as coal, to the fire pot and to distribute the same therein in such a manner that the fuel will burn evenly throughout without causing the formation of clinkers.

A further object of the invention consists in the provision of a novel form of conveyer which is positioned vertically within a fuel chamber and so constructed that the fuel will be raised vertically into the fire pot and directed towards the side walls thereof.

Another object of the invention resides in the provision of a fuel conveyer in the form of a screw the upper turns or spirals of which are increased in width with their outer edges beveled downwardly and outwardly so as to not only raise the fuel into the fire pot but at the same time to direct the same towards the side wall of the pot.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, such changes may be made as will fall within the scope of the appended claims.

In the drawings:—

Figure 1:
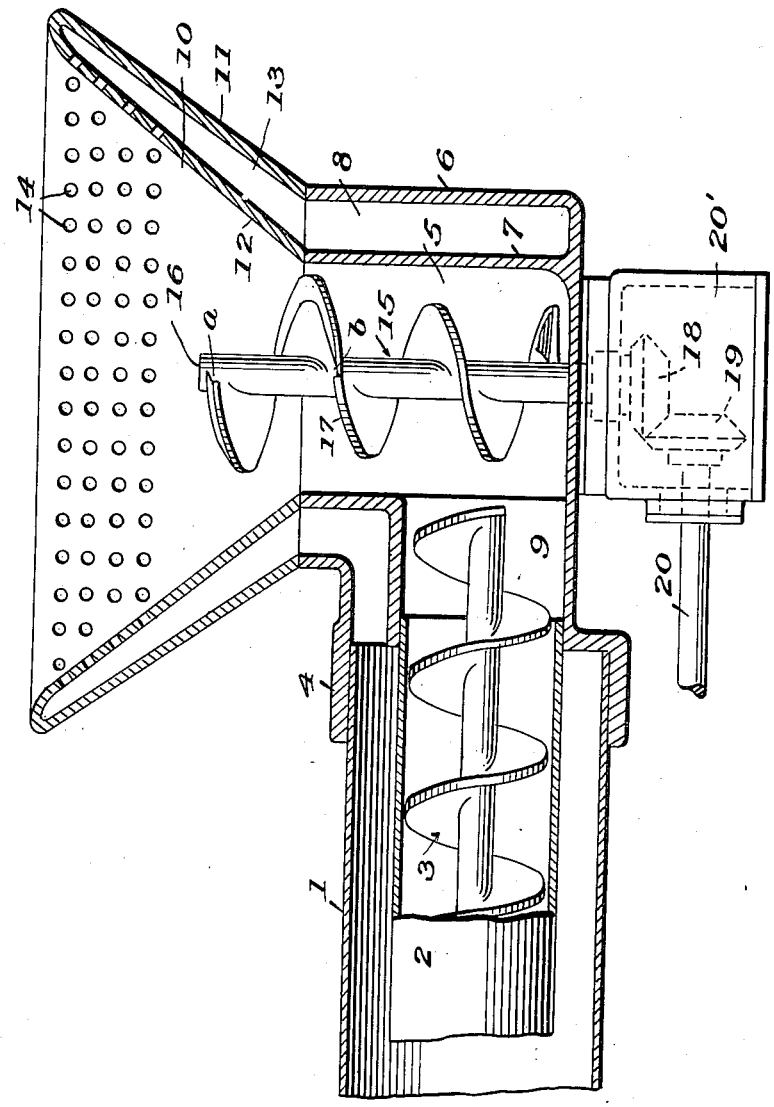
Fig. 1 is a vertical section through the fire pot, fuel chamber, horizontal fuel conduit, and air conduit, with the vertically arranged conveyer screw positioned in the fuel chamber and fire pot as well as other portions shown in elevation.

I am aware that it is old to feed fuel by a horizontal screw for delivery into a fuel chamber from which it is conveyed to the fire pot, by means of a vertical conveyer screw. However, in those forms of stokers or furnaces with which I am familiar trouble has been experienced in evenly distributing the fuel throughout the fire pot and it is particularly hard to do so where the wall of the fire pot is arranged at an angle. If the fuel is not evenly distributed throughout the fire pot complete combustion will only take place throughout a portion of the fuel bed and complete combustion will not take place adjacent the wall of the fire pot and this being the case clinkers will form with resultant disadvantages as will be appreciated. I have provided a novel form of conveyer screw which not only raises the fuel from the fuel chamber into the fire pot, but evenly distributes the fuel within the fire pot and towards and in close engagement with the wall thereof.

In the drawings, I indicates a horizontally arranged air conduit in which is positioned a fuel conduit 2 of less diameter and in which operates a horizontal conveyer screw 3 of well-known construction. Air is delivered to the air conduit 1 and fuel to the fuel conduit 2 in any desired manner and the screw conveyer 3 may be operated from any suitable source of power. However, as these features form no part of my present invention, but are of well-known construction a further description and illustration thereof is not thought necessary. The inner end of the air conduit I is received in the sleeve portion 4 of the fuel chamber 5. The fuel chamber 5 is provided with the outer wall 6 and inner wall 7 forming an air chamber 8 and the inner end of the fuel conduit 2 leads into an opening 9 which passes through the inner wall 7 of the fuel chamber and communicates with the fuel chamber 5.

Supported on the top of the fuel chamber is the fire pot indicated generally at 10 and which, as shown, consists of the upwardly and outwardly inclined outer wall 11 and inner wall 12, the walls being spaced to provide an air chamber 13 communicating with the air chamber 8 of the fuel chamber. The inner wall 12 is provided with the circumferentially and vertically spaced rows of perforations 14, preferably positioned above the horizontal center line of the fire pot although I wish it understood that the perforations need not be positioned in the exact manner shown but may be positioned, as desired, to convey air to the fuel bed and to secure proper combustion.

Figure 2:
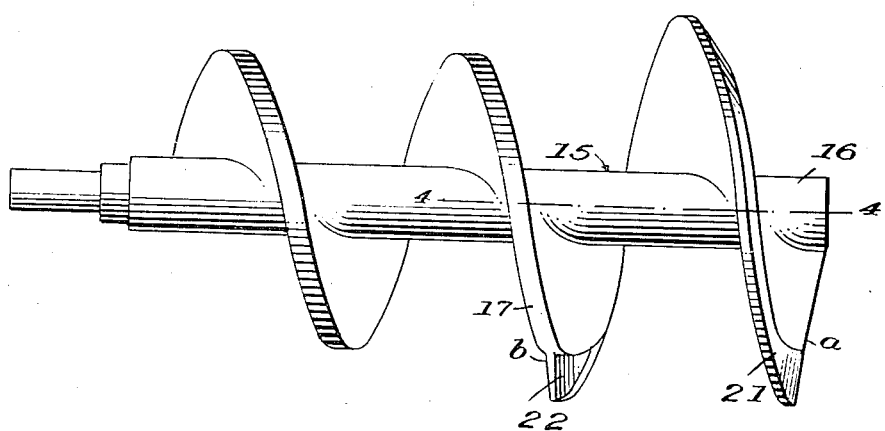
Fig. 2 is a side elevation of the vertical conveyer screw.
Figure 3:
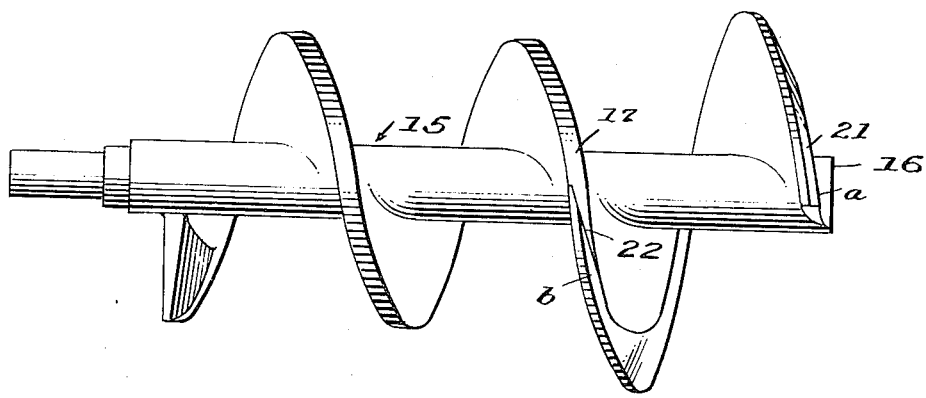
Fig. 3 is a side elevation of the opposite side of the screw conveyer shown in Fig. 2.
Figure 4:
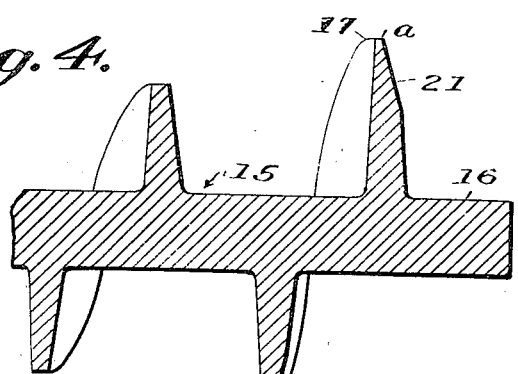
Fig. 4 is a fragmental vertical section on the line 4—4 of Fig. 2.

At 15, I have indicated my improved form of screw conveyer which includes the shaft 16 and spiral flange 17. On the lower end of the shaft 16 is provided a beveled gear 18 which meshes with a beveled gear 19, carried by a horizontal shaft 20. The gears 18 and 19 are positioned within the gear housing 20'. As to the specific construction of my improved form of screw conveyer 15 attention is more particularly directed to Figs. 2, 3 and 4 of the drawings. The upper turns of the screw or spiral flange are increased in width or extended from the point indicated generally at *a* to the point *b* and this extended portion of the flange or screw is downwardly and outwardly beveled as shown at 21. At the point *b* the upper surface of the extension is beveled downwardly towards the end as shown at 22 more particularly in Figs. 2 and 3 of the drawings.

From the above detailed description it is thought that the construction and manner of use will be clearly understood. However, I will elaborate to some extent and direct attention to the fact that the fuel is fed through the conduit 2 by the screw 3 and delivered into the fuel chamber 5. From the fuel chamber 5 the fuel is fed upwardly by the screw conveyer 15 and when the fuel reaches the upper curves or spirals of the screw, between the points *a* and *b*, the beveled surface 21, of the extended portion of the flange or spiral 17, will have a tendency to direct a portion of the fuel towards the side wall of the fire pot 10, it being understood that the fuel will have a tendency to slide off of the beveled surface. The beveled or inclined surface 22, of the extended portion of the upper turns of the curves or spirals of the screw, permits the extension to dig into the fuel and permit the same to be elevated. It will thus be seen that my improved form of screw conveyer has a lower portion in which the flange or spiral is of the desired width with the upper turns of the spiral or flange increased in width with the beveled portions for directing the fuel towards the side of the fire pot. Air for combustion is conveyed from the conduit 1 into the chamber 8 of the fuel chamber and from that chamber into the chamber 13 of the fire pot from which it is discharged through the perforations 14 into the bed of fuel.

Having fully described my invention what I claim as new and desire to secure by Letters Patent is:—

1. A stoker mechanism of the character described including a fuel chamber, a fire pot, and means for conveying the fuel from the fuel chamber to the fire pot, said means including a vertical continuous spiral conveyor the upper flights of which are increased in width with respect to the lower flights, the upper surfaces of the increased portions of the upper flights being downwardly and outwardly beveled to provide surfaces on the upper flights one at an angle with respect to the other, one of said surfaces directing the fuel vertically while the other directs the fuel upwardly and outwardly towards the side wall of the fire pot.

2. A stoker mechanism of the character described including a fuel chamber, a fire pot, and means for conveying the fuel from the fuel chamber to the fire pot, said means including a vertical continuous spiral conveyor the upper flights of which are increased in width with respect to the lower flights, the upper surfaces of the upper flights being downwardly and outwardly beveled from a point intermediate the widths thereof to the edges to provide surfaces one at an angle with respect to the other, one of said surfaces directing the fuel vertically while the other directs the fuel upwardly and outwardly towards the side wall of the fire pot.

MYRON B. GEISELMAN.